United States Patent [19]
Anders et al.

[11] Patent Number: 5,871,823
[45] Date of Patent: Feb. 16, 1999

[54] HYDROPHILIC COATING OF SURFACES OF POLYMERIC SUBSTRATES

[75] Inventors: Christine Anders, Haltern; Hartwig Hoecker; Doris Klee, both of Aachen; Guenter Lorenz, Marl, all of Germany

[73] Assignee: Huels Aktiengesellschaft, Marl, Germany

[21] Appl. No.: 871,551

[22] Filed: Jun. 9, 1997

[30]     Foreign Application Priority Data

Jun. 19, 1996  [DE]  Germany .......................... 196 24 468.4
Jan. 3, 1997   [DE]  Germany .......................... 197 00 079.7

[51] Int. Cl.$^6$ ..................................................... C08S 7/04
[52] U.S. Cl. ....................... 427/512; 427/322; 427/393.5; 427/558; 427/559; 427/581; 427/595
[58] Field of Search ..................................... 427/491, 512, 427/508, 536, 558, 322, 393.5, 559

[56]               References Cited

U.S. PATENT DOCUMENTS 5,002,794   3/1991   Ratner et al. ........................... 427/488

FOREIGN PATENT DOCUMENTS 0 574 352 A    6/1993   European Pat. Off. .
28 13 558 A    3/1978   Germany .
2 025 433 A    5/1979   United Kingdom .

OTHER PUBLICATIONS

D. Briggs, et al., J. Mater. Scie. 14, pp. 1344–1348, "X–ray Photoelectron Spectroscopy Studies Of Polymer Surfaces" (No date avail.).

J.M. Lane, et al., Progress in Organic Coatings, 21, pp. 269–284, "Surface Treatment of Polyolefins" (No date avail.).

W. Möhl, et al., Kunstoffe 81, 1991, pp. 576–578, "Kunststoffoberflächen im Niederuckplasma Vorbehandelin" ((No month avail.).

J.F. Friedrich, et al., GAK Jun. 1994, vol. 47, pp. 382–388, "Vorbehandlung Von Polymeren Mit Normal—Und Niederdruckplasmen Zur Herstellung Hochhaftfester Verklebungen Mit Polyurethanen" (No date avail.).

Kang–Wook Lee, et al., Macromolecules, vol. 21, No. 2, 1988, pp. 309–313, "Surface–Selective Hydroxylation of Polypropylene".

S.R. Shukla, et al., J. Appl. Poly. Sci., vol. 51, 1994, pp. 1567–1574, "Ultraviolet Radiation–Induced Graft Copolymerization of 2–Hydroxyethyl Methacrylate Onto Polypropylene"(No month avail.).

H. Mirzadeh, et al., Biomaterials 1995, vol. 16, No. 8, 1995, pp. 641–648, "Cell Attachment to Laser–Induced AAm— and Hema–Grafted Ethlene–Propylene Rubber as Biomaterial: In Vivo Study" (No month avail).

S. Edge, et al., Polymer Bulletin 27, 1992, pp. 441–445, "The Surface Modification of Poly(EtheImide) By Photochemical Grafting" (No month avail.).

B. Jansen, et al., J. Polymer Sci., Polymer Symposium 66, 1979, pp. 465–473, "Radiation–Induced Modification of Polyurethane–Elastomers With Hydroxyethyl Methacrylate" (No month avail.).

H. Yasuda, J. Poly. Sci.: Macromolecular Review, vol. 16, 1981, pp. 199–293, "Glow Discharge Polymerization" (No month avail.).

H. Morra, et al., J. Biomed. Mat. Res. vol. 29, 1995, pp. 39–45, "Surface Field of Forces and Protein Adsobtion Behavior of Poly(Hydroxyethymethacrylate) Films Deposited From Plasma" (No month avail.).

P. Gateholm, et al., Poly. Mater. Sci., 1992, 66, pp. 445–446, "Novel Biomaterials Prepared By Ozone–Induced Polymerization" (No month avail.).

H. Thelen, et al., Fresnius J. Anal. Chem., 1995, 353, pp. 290–296, "Development and Characterization of a Wettable Surface Modified Aromatic Polyethersulphone Using Glow Discharge Induced Hema–graft Polymerisation" (No month avail.).

A.W. Neumann and R.J. Good, Surface and Colloid Science, vol. 11, 1979, pp. 31–47 and 88–89, "Techniques of Measuring Contact Angles" (No month avail.).

Ikada, Y., Suzuki, M., Tanaguchi, M. Iwata, H., Taki., H., Yonekawa, Y., Handa, H. (1981) Radiat. Phys, Chem. 18:1207 (No month avail.).

Ishigaki, I., Sugo, T., Senoo, K., Okada, T., Okamoto, J., Machi, S., (1982), Appl. Polymer Sci. 27:1933 (No month avail.).

Uyama, Y., Tadorkoro, H., Ikada, Y., (1990), J. Appl. Polymer Sci. 39:489 (No month avail.).

Uchida, E., Uyama, Y., Ikada, Y., (1989), J. Polymer Sci. 27:527 (No month avail.).

Uchida, E., Uyama, Y., Iwata, H., Ikada, Y. (1990), J. Polymer Sci. 28:2837 (No month avail.).

Tan, K.L., Woon, L.L., Wong, H.K., Kang, E., Neoh, K.G., (1993); Macromolecules 26:2832 (No month avail.).

Kang, E.T., Neoh K.G., Tan, K.L., Uyama, Y., Morikawa, N., Ikada, Y., (1992), Macromolecules 25:1959 (No month avail.).

Suzuki, M., Kishida, A., Iwata, H., Ikada, Y., (1986), Macromolecules 19–1804 (No month avail.).

Patent Abstracts of Japan, 06179764, Jun. 28, 1994 (No month avail.).

*Primary Examiner*—Bernard Pianalto
*Attorney, Agent, or Firm*—Oblon, Spivak, McClelland, Maier & Neustadt, P.C.

[57]                ABSTRACT

A hydrophilic coating on a polymeric substrate is prepared by subjecting at least one hydrophilic vinyl monomer to radiation-induced graft polymerization on an activated substrate surface.

12 Claims, No Drawings

HYDROPHILIC COATING OF SURFACES OF POLYMERIC SUBSTRATES

BACKGROUND OF THE INVENTION

1. Field of the Invention

The present invention relates to a process for the production of hydrophilic coatings on polymeric substrates which are bonded chemically to the surfaces of substrates. The invention furthermore relates to objects with surfaces coated in this way and to their use for industrial, medical or bioengineering purposes.

2. Description of the Background

Polymers (or plastics) with a hydrophilic surface produced by a special treatment have various advantages over non-treated polymers which usually have a hydrophobic surface, depending on the intended use. The higher surface energy has the effect of better wettability with water, aqueous solutions or dispersions and with other liquids of high surface tension. An improved wettability achieved by subsequent hydrophilization, is beneficial or even necessary, for example, if a surface of a plastic is to be dyed or printed with polar dyestuffs or if surfaces of plastics are to be bonded to one another with the aid of a polar adhesive. Fibers and textile fabrics or wovens of polymers also require good wettability for sizing, finishing and dyeing.

Hydrophilization is also of importance for polymeric materials which are used in aqueous systems. Thus, industrial membranes, for example, those used for the desalination of sea water, must be readily wettable in order to be able to display their separating action in full. The surfaces of pipes of plastic or chemical apparatuses must be readily wettable if good heat exchange with the surroundings and/or, in the case of pipes, good flow is required. A good wettability is also of advantage for beds of polymer particles, for example ion exchange resins, and bulk porous layers, for example dialysis membranes, through which material flows. Gas bubbles which settle on the liquid-side surfaces of pipes, hoses or containers of plastic are also undesirable, because they inhibit functioning since the surfaces cannot be wetted adequately by the liquid.

Hydrophilized surfaces of plastic are indispensable for many medical or bioengineering applications, because they are very readily compatible with blood, tissue fluids or other liquids with sensitive biological constituents, in contrast to the standard plastics which are usually hydrophobic by nature, Examples of such applications are blood plasma containers, dialysis hoses, catheters, contact lenses and the like.

The hydrophilization of polymeric substrates can be effected by a single-stage or multistage physical and/or chemical treatment. All known treatment processes have as their objective the provision of hydrophilic groups, such as hydroxyl, carboxyl or also keto groups, on the surface of the polymeric substrate. This can be achieved by processes in which the hydrophilic groups are formed from peripheral layers of the polymer itself. Alternatively or additionally, layers of hydrophilic compounds can be applied to the surface, which may have been treated beforehand, and, if they are vinyl monomers, they can be polymerized.

The single-stage treatment processes which produce the desired hydrophilic groups from the polymer itself include flaming techniques (D. Briggs et al, J. Mater. Sci. 14. 1979, 1344) and corona treatments (J. M. Lane et al, Progress in Organic Coatings 21, 1993, 269–284). However, the hydrophilicity produced as a result of these treatments is often unstable and degrades within hours or days. Plasma processes which produce the hydrophilic groups from the polymer itself in one stage have also been disclosed. According to W. Mohl, Kunststoffe 81 (1981), 7, polyethylene or polypropylene is treated with low pressure plasma and is then more suitable for the production of composite materials. J. F. Friedrich et al in GAK June 1994, Volume 47, 382–388 similarly describe a plasma pretreatment of polymers, for example polyolefins, as a result of which they can be bonded more easily with polyurethanes. Plasma processes produce satisfactory results if the substrates are bonded soon after the treatment. Stabilization of the hydrophilic properties is possible by further reaction, for example with hydrophilic monomers. As a result chemically bonded hydrophilic, optionally bulky groups, which cannot migrate to the inside, are produced on the surface. In addition, plasma processes often lead to erosion of the surface which make the surface rough. This is often undesirable, for example if the objective of the hydrophilization is to reduce the coefficient of friction on contact with water. Roughening of the surface impairs the tribological properties thereof and counteracts this objective.

As a result of a single-stage oxidative treatment with chromium (VI) acid, hydrophilic groups form on the surface of polypropylene from the layers close to the surface (Kang-Wook Lee et al, in Macromolecules 1988, 21, 309–313). Chromium (VI) compounds are avoided where possible in industry, because they are carcinogenic and are not permitted to be discharged into the environment.

In a number of other known processes, the hydrophilic groups are introduced by coating with a hydrophilic coating agent. A distinction can be made here between processes with and without pretreatment of the surfaces of the polymeric substrate, for example, by means of laser, plasma or the like (the initial cleaning of the surface with a solvent, envisaged for almost all the relevant processes, is not rated as a pretreatment).

One coating process without pretreatment of the substrate is the grafting of polypropylene with 2-hydroxyethyl methacrylate (HEMA), which has been described by S. R. Shukla et al in J. Appl. Poly. Sci., Volume 51, 1567–74 (1994). If the polymerization is initiated with UV radiation, the additional use of methanol as a solvent, which is toxicologically unacceptable and pollutes the waste water, is required. If the polymerization is initiated by uranyl nitrate or cerium ammonium nitrate, the heavy metals uranium and cerium must be prevented from entering the waste water.

Coating processes without pretreatment of the substrate also include the procedure disclosed by B. D. Ratner et al, U.S. Pat. No. 5,002,794, in which hydrophilic substances, such as polyethylene glycol or 2-hydroxyethyl methacrylate (HEMA), are deposited on metallic or silicatic surfaces or surfaces of plastic by means of plasma. Hydrophilic monomers, such as HEMA, polymerize spontaneously here under the influence of free radicals formed by the plasma. H. Mirzadeh et al, Biomaterials, 1995, Volume 4, No. 8, 641–648, mention the grafting of acrylamide or HEMA onto a specific polymer, i.e. vulcanized ethylene/propylene rubber, with the aid of a pulsed $Co_2$ laser. According to S. Edge et al, Polymer Bulletin 27 (1992), 441–445, poly(ether imides) are hydrophilized by photochemical grafting of HEMA from the vapor phase without pretreatment of the surface, using a mercury vapor lamp as the source of radiation. Moreover, according to B. Jansen et al, J. Polymer Sci., Polymer Symposium 66 (1979), 465–473, a specific polyurethane, Tuftan 410 from B. F. Goodrich, can be grafted with HEMA under irradiation with gamma rays from cobalt-60. One disadvantage of this process is the expensive radiation protection measures which it requires.

It remains to be seen whether, in the processes mentioned in the preceding paragraph, the radiation and the plasma effect only polymerization of the monomers or at the same time also activate the surface of the polymeric substrate. The latter is probably the case, since on the one hand, as mentioned above, the hydrophilizing action of the plasma and of the corona treatments on surfaces of plastic is known. At any rate, the radiation and the plasma have such a high energy that the hydrophilic monomers and the resulting polymer are attacked. H. Yasuda accordingly refers, in J. Poly. Sci.: Macromolecular Review, Volume 16, 199–293 (1981), to the undefined and uncontrollable chemistry of plasma polymerization. That molecules are destroyed here can be demonstrated in the coating of surfaces with HEMA by the fact that analysis by ESCA (electron spectroscopy for chemical analysis), according to H. Morra et al, J. Biomed. Mat. Res., 29, 39–45, 1995, gives lower values for oxygen than would be expected from the composition of HEMA and which are also actually found in HEMA polymerized in the customary manner, i.e. by means of free radicals. This may be irrelevant for some applications. However, for medical and bioengineering applications, a layer of intact HEMA is highly desirable, because, as already mentioned, such layers are very readily compatible with the sensitive constituents of the liquids handled in these applications.

However, processes have also been disclosed in which coating with polymerizable monomers is preceded by an activating radiation treatment which modifies the surface of the plastic. Activation and coating of the surface are thus done at separate times. P. Gatenholm et al, Poly. Mater. Sci., 1992, 66, 445–6 describe the hydrophilization of films and microporous membranes of polypropylene by treatment with ozone and subsequent coating with HEMA, polymerization of which is induced by dissociation of the hydroperoxide groups formed on the surface. A disadvantage of this process is that ozone, in a relatively high concentration, destroys the polymer. Finally, H. Thelen et al in Fresenius, J. Anal. Chem. 1995, 353, 290–296 describe a hydrophilizing treatment of polyether sulfones in which the substrate is first treated with nitrogen plasma in the presence of small amounts of oxygen and then coated with HEMK. The process is laborious because the polyether sulfone membrane must be extracted before the coating and, as is also the case in the process of Gatenholm et al, oxygen, which inhibits the polymerization, must be carefully excluded from the HERA solution. Furthermore, the concentration of hydroperoxide groups on the surface and, therefore, the grafting density are difficult to control in the two processes mentioned. A need, therefore, continues to exist for a more effective means of providing a polymeric substrate with a hydrophilic coating.

SUMMARY OF THE INVENTION

Accordingly, one object of the invention is to provide a polymeric substrate with an improved coating of hydrophilic material.

Briefly, this object and other objects of the present invention as hereinafter will become more readily apparent can be attained by a process for the production of a hydrophilic coating on a polymeric substrate by subjecting at least one hydrophilic vinyl monomer to radiation-induced graft polymerization on an activated substrate surface.

DETAILED DESCRIPTION OF THE PREFERRED EMBODIMENTS

The process gives, in a comparatively simple and easily reproducible manner, smooth hydrophilic layers of the polymerized hydrophilic vinyl monomer which, according to analysis by means of a scanning electron microscope, are continuous and, according to ESCA, do not differ from layers which have been produced from the same vinyl monomer with agents which form free radicals as the initiators. The hydrophilic character of the surfaces, detectable from the smaller contact angle, is increased considerably, or provided in the first place, by the process of the present invention. The process can be carried out with a large number of different polymeric substrates and various hydrophilic vinyl monomers. The hydrophilic polymer layers are bonded covalently to the substrate, that is to say cannot be detached from the substrate selectively with solvents and are, therefore, very durable. The process operates exclusively with an aqueous system, so that the waste water is not polluted with organic solvents and/or heavy metals. The sources of radiation required for UV radiation with the stated wavelengths are commercially obtainable. The polymeric substrates coated by the process of the invention are outstandingly suitable for use for industrial, medical and bioengineering purposes.

1. The polymeric substrate

The polymeric substrates whose surfaces can be coated hydrophilically by the present process include homo- and copolymers, for example polyolefins, such as polyethylene, polypropylene, polyisobutylene, polybutadiene, polyisoprene, naturally occurring rubbers and polyethylenecopropylene; halogen-containing polymers, such as polyvinyl chloride, polyvinylidene chloride, polychloroprene, polytetrafluorothylene and polyvinylidene fluoride; polymers and copolymers of vinylaromatic monomers, such as polystyrene, polyvinyloluene, polystyrene-co-vinyltoluene, polystyrene-co-acrylonitrile and polystyrene-co-butadiene-co-acrylonitrile-, polycondensates, for example polyesters, such as polyethylene terephthalate and polybutylene terephthalate-polyamides, such as polycaprolactam, polylaurolactam and the polycondensate of adipic acid and hexamethylenediamine; polyether-block amides, for example of laurolactam and polyethylene glycol with on average 8, 12 or 16 ethyleneoxy groups-, and furthermore polyurethanes, polyethers, polycarbonates, polysulfones, polyether ketones, polyester-amides and -imides, polyacrylonitrile and polyacrylates and -methacrylates. Blends of two or more polymers or copolymers can also be hydrophilized by the process, as can combinations of various plastics which are joined to one another by adhesive bonding, welding or fusion, including the transition regions.

2. The hydrophilic vinyl monomers

Suitable hydrophilic vinyl monomers contain at least one olefinic double bond and at least one hydrophilic group. The olefinic double bonds can be present in the most diverse functional groups, for example in alkenyl residues, such as vinyl or allyl residues, or in functional groups which are derived from unsaturated carboxylic acids or derivatives thereof, such as acrylic acid, methacrylic acid, the amides of these carboxylic acids or maleic acid. There is also great diversity with respect to the hydrophilic groups. Examples of suitable hydrophilic groups which include hydroxyl groups, ether groups, acyloxy groups, carboxyl groups, carboxylic acid ester groups, carboxylic acid amide groups, carboalkoxy groups and nitrile groups-, 1,2-epoxide groups-sulfuric acid esters and sulfonic acid, sulfinic acid, phosphoric acid, phosphonic acid and phosphinic acid groups, including their corresponding salts and esters- primary, secondary and tertiary amino groups- acylamino groups, which can be incorporated as an open chain or in a ring-polyalkylene oxide groups, such as polyethylene oxide groups and polypropylene oxide groups, with or without a terminal hydroxyl group-, polyester, polyesteramide and polyether-ester-amide groups-, and residues of olefinically functionalized sugars. The balance between hydrophilic and hydrophobic contents in the molecule of the monomer are of course important for the hydrophilicity of a monomer. Monomers which are suitable for the invention are soluble at 20° C. in water to the extent of at least 1% by weight, advantageously to the extent of at least 10% by weight and in particular to the extent of at least 40% by weight, in each case based on the total solution.

The hydrophilic vinyl monomers used in the invention preferably contain one olefinic double bond and one hydrophilic group. However, they can also contain two or more olefinic double bonds and/or hydrophilic groups. Thus, for example, chain-like polyalkylene oxides with two terminal vinyl, allyl, acryloxy or methacryloxy groups are suitable.

Examples of suitable hydrophilic vinyl monomers which may be mentioned are: acrylic acid and derivatives thereof, for example acrylamide, N,N-dimethylacrylamide, acrylonitrile, methyl acrylate, 2-hydroxyethyl acrylate, 2-hydroxypropyl acrylate, 2-methoxyethyl acrylate, 2-ethoxyethyl acrylate, 4-hydroxybutyl acrylate and 1,4-butanediol diacrylate, and methacrylic acid and corresponding derivatives thereof, carboxylic acid vinyl derivatives, such as vinyl acetate, N-vinylacetamide and N-vinylpyrrolidone-vinylsulfonic acids and alkali metal salts thereof, such as sodium vinylsulfonatealkenylarylsulfonic acids and alkali metal salts thereof, such as styrene sulfonic acid and sodium styrene sulfonate-vinyl ethers, such as vinyl methyl ether, vinyl ethyl ether, vinyl glycidyl ether, diethylene glycol divinyl ether and vinyl n-butyl ether, vinyl ketones, such as vinyl methyl ketone, vinyl ethyl ketone and vinyl n-propyl ketone; vinylamines, such as N-vinylpyrrolidine; polyalkylene compounds with terminal allyl, vinyl, acrylic or methacrylic groups, such as ethoxytetraethoxyethyl acrylate or methacrylate, n-propoxydodecaethyleneoxyethyl vinyl ether, polyethylene glycol monoacrylates having molecular weights of 600 or 1200, poly(ethylene/ propylene) glycol monomethacrylates having molecular weights of 400 and 800, and allyloxyoctapropylenexyethanol; sugar derivatives, such as vinyl-substituted arabinose or acryloylated hydroxypropylcellulose; and functionalized polyalkylene glycols, such as triethylene glycol diacrylate or tetraethylene glycol diallyl ether.

The monomers can be used in each case individually or as a mixture adapted to the particular intended use. A coating of a homo- or a copolymer is obtained accordingly on the substrate. The monomers are in general employed as 1 to 40, advantageously as 5 to 20% strength by weight solutions. The solvent is expediently water. The solutions do not have to comprise any of the known polymerization initiators or other additives known for polymerization processes.

3. The activation of the polymeric substrates

According to the invention, the surfaces of the substrates can be activated by a number of methods. They are expediently freed from adhering oils, greases or other impurities beforehand in a known manner by means of a solvent.

3.1 The activation of standard polymers without groups which are sensitive to UW radiation can advantageously be carried out by UV radiation, for example in the wavelength range from 100 to 400 nm, preferably from 125 to 310 nm. Particularly good results are achieved with largely monochromatic, continuous radiation, such as is produced, for example, from excimer UV emitters (Heraeus, Kleinostheim, Germany), for example with $F_2$, $Xe_2$, ArF, XeCl, KrCl and KrF as the lamp medium. However, other sources of radiation, such as mercury vapor lamps with a broad radiation spectrum and radiation contents in the visible range, are also suitable if they emit considerable amounts of radiation in the wavelength ranges mentioned. It has been found that the presence of small amounts of oxygen is advantageous. The preferred oxygen partial pressures are between $2 \times 10^{-5}$ and $2 \times 10^{-2}$ bar. The procedure is carried out, for example, in a vacuum of $10^{-4}$ to $10^{-1}$ bar or using an inert gas, such as helium, nitrogen or argon, with an oxygen content of 0.02 to 20 per thousand.

The optimum duration of the irradiation depends on the polymeric substrate, the composition of the surrounding gas medium, the wavelength of the radiation and the output of the source of radiation and can easily be determined by guideline preliminary experiments. In general, the substrates are irradiated for 0.1 second to 20 minutes, in particular 1 second to 10 minutes. During these short irradiation times, the polymeric substrate heats up to only a small degree, and even under radiation with wavelengths at the severe end of the wider range mentioned, there are no undesirable side reactions which could lead to damage to the exposed surfaces.

3.2 According to the invention, activation can also be achieved by a high-frequency or microwave plasma (Hexagon, Technics Plasma, 85551 Kirchheim, Germany) in air or a nitrogen or argon atmosphere. The exposure times are in general 30 seconds to 30 minutes, preferably 2 to 10 minutes. The energy introduced by laboratory equipment is between 100 and 500 W, preferably between 200 and 300 W.

3.3 Corona apparatuses (SOFTAL, Hamburg, Germany) can furthermore also be used for the activation. The exposure times in this case are in general 1 second to 10 minutes, preferably 1 to 60 seconds.

3.4 Activation by electron beams or gamma rays (for example from a cobalt-60 source) allows short exposure times which are in general 0.1 to 60 seconds.

3.5 Flaming of surfaces likewise leads to activation thereof. Suitable apparatuses, in particular those having a barrier flame front, can be constructed in a simple manner or obtained, for example, from ARCOTEC, 71297 Mannheim, Germany. The apparatus can be operated with hydrocarbons or hydrogen as the combustible gas. In all cases, damaging overheating of the substrate must be avoided, which can easily be achieved by intimate contact with a cooled metal surface on the substrate surface facing away from the flaming side. Activation by flaming is accordingly limited to relatively thin, flat substrates. The exposure times are in general from 0.1 second to 1 minute, preferably 0.5 to 2 seconds, the flames without exception being nonluminous flames and the distances from the substrate surfaces to the outer flame front being 0.2 to 5 cm, preferably 0.5 to 2 cm.

3.6 Substrate surfaces can furthermore also be activated by treatment with strong acids or bases. Suitable strong acids include sulfuric acid, nitric acid and hydrochloric acid. For example, polyamides can be treated with concentrated sulfuric acid at room temperature for 5 seconds to 1 minute. Particularly suitable strong bases include alkali metal hydroxides in water or an organic solvent. Thus, for example, dilute sodium hydroxide solution can be allowed to act on the substrate for 1 to 60 minutes at 20° to 80° C. Alternatively, for example, polyamides can be activated by allowing 2% strength KOH in tetrahydrofuran to act on the substrate surface for 1 minute to 30 minutes.

3.7 Finally, monomers with groups which are sensitive to UV radiation can be copolymerized during preparation of the substrate polymers. Suitable such monomers include, inter alia, furyl or cinnamoyl derivatives, which can be used, for example, in amounts of 3 to 15 mol %. Particularly suitable monomers of this type include cinnamoylethyl acrylate and cinnamoylethyl methacrylate.

In some cases, for example with highly hydrophobic polymers, it may be advisable to activate the substrate surface by a combination of two or more of the methods mentioned. The preferred method of activation is that with UV radiation as described in 3.1.

4. Coating by grafting (co)polymerization

When the substrates have been activated by one of the methods described under 3.1 to 3.6, the activated surfaces are expediently exposed to the action of oxygen, for example in the form of air, for 1 to 20 minutes, preferably 1 to 5 minutes.

The activated surfaces (where appropriate also those activated according to 3.7) are then coated by known methods, such as dipping, spraying or brushing, using solutions of the vinyl monomer or monomers. Solvents which have proved suitable are water-ethanol mixtures, although other solvents can also be used if they have a sufficient dissolving power for the monomer or monomers and readily wet the substrate surface. The concentrations of the monomers in the solution can be 1 to 40% by weight, depending on the solubility of the monomers and the desired layer thickness of the finished coating. Solutions having monomer contents of 5 to 20% by weight, for example about 10% by weight, have proved suitable in practice and in general give, in one path, continuous coatings which cover the substrate surface and have layer thicknesses which can be more than 0.1 μm.

After evaporation of the solvent or during evaporation, the polymerization or copolymerization of the monomer or monomers applied to the activated surface is expediently induced by rays in the short wavelength segment of the visible range or in the long wavelength UV range of electromagnetic radiation. Radiation with wavelengths of 250 to 500 nm, preferably 290 to 320 nm, for example, is particularly suitable. Radiation in the wavelength range mentioned are relatively gentle, selected with respect to the polymerization and do not attack the polymeric substrate. As in the case of activation of these substrates, it is also advantageous here to use a radiation source which emits largely monochromatic, continuous rays. Excimer UV emitters with continuous radiation, for example with XeCl or XeF as the emitter medium, are again particularly suitable. The intensity required for the radiation and the duration of the action depend on the particular hydrophilic monomers and can easily be determined by guiding experiments. In principle, mercury vapor lamps can also be used here if they emit considerable proportions of radiation in the wavelength ranges mentioned. The exposure times are in all cases in general 10 seconds to 30 minutes, preferably 2 to 15 minutes.

It is sometimes expedient to repeat the steps described, including the activation, in order to produce a hermetically closed and/or thicker coating by means of such a multilayer technique. Alternatively, it is also possible to immerse the activated substrate, if appropriate after the oxygen treatment described, into the solution of the vinyl monomer or monomers to be used and to irradiate the substrate in the immersed state. The irradiation times with a given source of radiation and the contact times, which are longer if appropriate, of the substrate and immersion bath with which the desired layer thickness is achieved can easily be determined by guiding experiments.

Objects which have a surface coated hydrophilically by the process of the invention are processed for use for industrial, medical or bioengineering purposes, such as have been mentioned above. If the substrates coated hydrophilically by the process of the invention are to be free from monomers when used, it is expedient to extract the residual monomers from the polymeric hydrophilic coating. This can be effected with water and then with an organic solvent, for example with hydrocarbons, such as hexane or cyclohexane, and/or with an alkanol having 1 to 4 carbon atoms, such as ethanol and n-propanol. A mixture of n-hexane and ethanol having 65 to 85% by volume of n-hexane, for example, is particularly suitable for the second extraction step.

Having generally described this invention, a further understanding can be obtained by reference to certain specific examples which are provided herein for purposes of illustration only and are not intended to be limiting unless otherwise specified.

The change in the contact angle of a drop of water or an air bubble is a measure of the hydrophilizing action of the process of the invention. For example, an air bubble is produced below the specimen surrounded by water, rises to the specimen and wets this as a function of the hydrophilicity thereof. Such a method has been described by R. J. Good et al, Techniques of Measuring Contact Angles in Surface and Colloid Science (Editor R. J. Good), Volume 11, Plenum Press New York, N.Y., 1979. In the following examples, the contact angles have been measured in accordance with this specification at 25° C.

EXAMPLE 1

A specimen piece of a polyamide film 100 μm thick (polyamide 12: L2101 F from Huls AG) of dimensions 5×8 cm was exposed to excimer radiation of 172 nm wavelength for 5 minutes under a reduced pressure of 1 m bar. The radiation originated from an excimer UV emitter with $Xe_2$ as the laser gas and an output of 1.7 kW. The distance between the specimen and the radiation source was 4 cm.

The specimen activated in this way was kept in air for 3 minutes, immersed in a 10 percent strength by weight aqueous solution of 2-hydroxyethyl methacrylate and, in the immersed state, irradiated with excimer radiation of 308 nm wavelength for 5 minutes. To remove residual monomers, the specimen piece was placed in water at 50° C. three times for 2 hours each time and then extracted with n-hexane and ethanol (volume ratio 79:21) in a Soxhlet apparatus for 24 hours.

The results of the example, and also those of the following Examples 2 to 6, are summarized in the following Table 1.

EXAMPLE 2

The same procedure as described in Example 1 was followed, except that 4-hydroxybutyl acrylate was used as the hydrophilic monomer.

EXAMPLE 3

The same procedure as described in Example 1 was followed, except that sodium vinylsulfonate in 25 percent strength by weight aqueous solution was used as the hydrophilic monomer.

EXAMPLE 4

A specimen piece of a polyethylene film 200 μm thick (type A 4042 from Vestolan GmbH) was irradiated with excimer rays having a wavelength of 172 nm for 1 minute, as described in Example 1, and likewise after 3 minutes in air was immersed in a 20 percent strength by weight aqueous solution of N-vinylpyrrolidone. The immersed specimen piece was then irradiated with UV excimer rays having a wavelength of 351 nm for 6 minutes, during which a polymer layer was produced on the substrate.

EXAMPLE 5

A polysulfone film 150 μm thick was produced by dissolving polysulfone (Ultrason® E 200, BASF AG) in dimethyl sulfoxide and pouring the solution into Petri dishes, where the solvent evaporated. This film was immersed in a 20 percent strength by weight solution of hydroxypropyl acrylate and, in the immersed state, irradiated with UV excimer rays having a wavelength of 351 nm for 5 minutes, during which a polymer layer was produced on the substrate.

EXAMPLE 6

Polyvinyl chloride (VESTOLIT® E 7012, Vestolit GmbH) was dissolved in tetrahydrofuran and the solution was poured into a Petri dish, where the solvent evaporated and a film 200 μm thick remained. The subsequent procedure followed was the same as described in Example 4, but acrylamide in the form of a 20 percent strength by weight aqueous solution was used as the hydrophilic monomer.

TABLE 1

| Exp. | Polymer | Surface composition (by ESCA) (Atom %) | | | | | | Contact angle (°) |
|---|---|---|---|---|---|---|---|---|
| | | C | O | S | Na | Cl | N | |
| 1 | Polyamide 12 untreated | 86.9 | 6.9 | — | — | — | 6.2 | 34 |
| | coated | 67.4 | 32.6 | — | — | — | — | 17 |
| 2 | Polyamide 12 coated | 72.3 | 27.7 | — | — | — | — | 22 |
| 3 | Polyamide 12 coated | 37.4 | 40.0 | 12.5 | 10.1 | | | 22 |
| 4 | Polyethylene untreated | 98.3 | 1.7 | — | — | — | — | 95 |
| | coated | 77.7 | 12.7 | — | — | — | 9.6 | 25 |
| 5 | Polysulfone untreated | 76.0 | 17.9 | 6.1 | — | — | — | 52 |
| | coated | 69.3 | 30.7 | — | — | — | — | 18 |
| 6 | PVC untreated | 69.9 | — | — | — | 30.1 | — | 89 |
| | coated | 63.9 | 19.3 | — | — | — | 16.8 | 24 |

The considerably smaller contact angle on the hydrophilized surfaces can be seen. The comparative ESCA measurements show a complete gapless coating with the particular polymer, which remained unchanged even after treatments with n-hexane/ethanol for several days.

EXAMPLES 7 TO 11

Various polymer substrates were coated with polymeric layers of various hydrophilic monomers in a manner analogous to Examples 1 to 6. The polymers, the monomers and the contact angles measured as shown in Table 2.

TABLE 2

| | | | Contact angle | |
|---|---|---|---|---|
| Exp. | Polymer | Hydrophilic monomer | Untreated | Coated |
| 7 | Polypropylene | Polyethylene oxide monoacrylate (molecular weight 600) | 92 | 21 |
| 8 | Polystyrene | Vinyl acetate | 93 | 27 |
| 9 | Polyurethane | Acrylic acid | 54 | 19 |
| 10 | Silicone | Diethylene glycol divinyl ether | 102 | 30 |
| 11 | Polyethylene terephthalate | Acryloylated hydroxypropyl cellulose | 71 | 22 |

What is claimed as new and desired to be secured by Letters Patent of the United States is:

1. A process for producing a hydrophilic coating on a polymer substrate comprising: (a) activating the polymer substrate by exposure to monochromatic, continuous UV radiation in the presence of oxygen and of a wavelength sufficient to provide hydroperoxide groups on the substrate; (b) immersing said activated substrate in a solution of at least one hydrophilic group-containing vinyl monomer; and (c) subjecting the immersed, activated substrate to monochromatic, continuous UV radiation of a wavelength sufficient to dissociate said hydroperoxide groups and induce graft copolymerization of the vinyl monomer onto the substrate.

2. The process as claimed in claim 1, wherein the hydrophilic vinyl monomer has a solubility in water at 20° C. of at least 10 g/l.

3. The process as claimed in claim 1, wherein the hydrophilic vinyl monomer is acrylic acid or an acrylic acid derivative, methacrylic acid or a methacrylic acid derivative, a carboxylic acid vinyl derivative, a vinylsulfonic acid or a vinylsulfonic salt, an alkenylarylsulfonic acid or an alkenylarylsulfonic acid salt, a vinyl ether, vinyl ketone or vinylamine, a polyalkyleneoxy compound with (a) terminal allyl, vinyl, acryl or methacryl group(s) or a functionalized sugar derivative with (a) vinyl group(s).

4. The process as claimed in claim 1, wherein 2-hydroxyethyl methacrylate (HEMA) is the hydrophilic vinyl monomer.

5. The process as claimed in claim 1, wherein the polymeric substrate is a polyolefin, polyamide, polyether-block amide, polysulfone, polyvinyl chloride, polystyrene, polyurethane, polyorganosiloxane, polyester, polycarbonate, polyether, polyethylene, polypropylene, polyisoprene or polytetrafluoroethylene or a mixture of such polymers.

6. The process as claimed in claim 1 wherein residual monomers are removed from the hydrophilic coating produced by extraction with water and/or an organic solvent.

7. The process as in claim 1, wherein the activated substrate is exposed to oxygen for a period of about 1 to about 20 minutes before contacting with the vinyl monomer.

8. The process as in claim 1, wherein the solution in step (b) contains about 1% to about 40% by weight of the monomer.

9. A process as in claim 1 where the radiation in step (a) is of a wavelength of 125 to 172 nm and the radiation in step (c) is of a wavelength of 290 to 351 nm.

10. A process for producing a hydrophilic coating on a polymer substrate comprising:
(a) activating the polymer substrate by copolymerizing the monomer or monomers forming said substrate with a vinyl comonomer containing a group sensitive to UV radiation;
(b) immersing the activated substrate in a solution of at least one hydrophilic group-containing vinyl monomer; and (c) subjecting the immersed, activated substrate to UV radiation to induce graft copolymerization of the vinyl monomer onto the substrate.

11. A process as in claim 10, wherein the vinyl comonomer in step (a) contains a furyl or cinnamoyl group.

12. A process as in claim 10, wherein the radiation in step (c) is UV radiation of a wavelength of about 250 to about 500 nm.

* * * * *